United States Patent Office 3,029,321
Patented Apr. 10, 1962

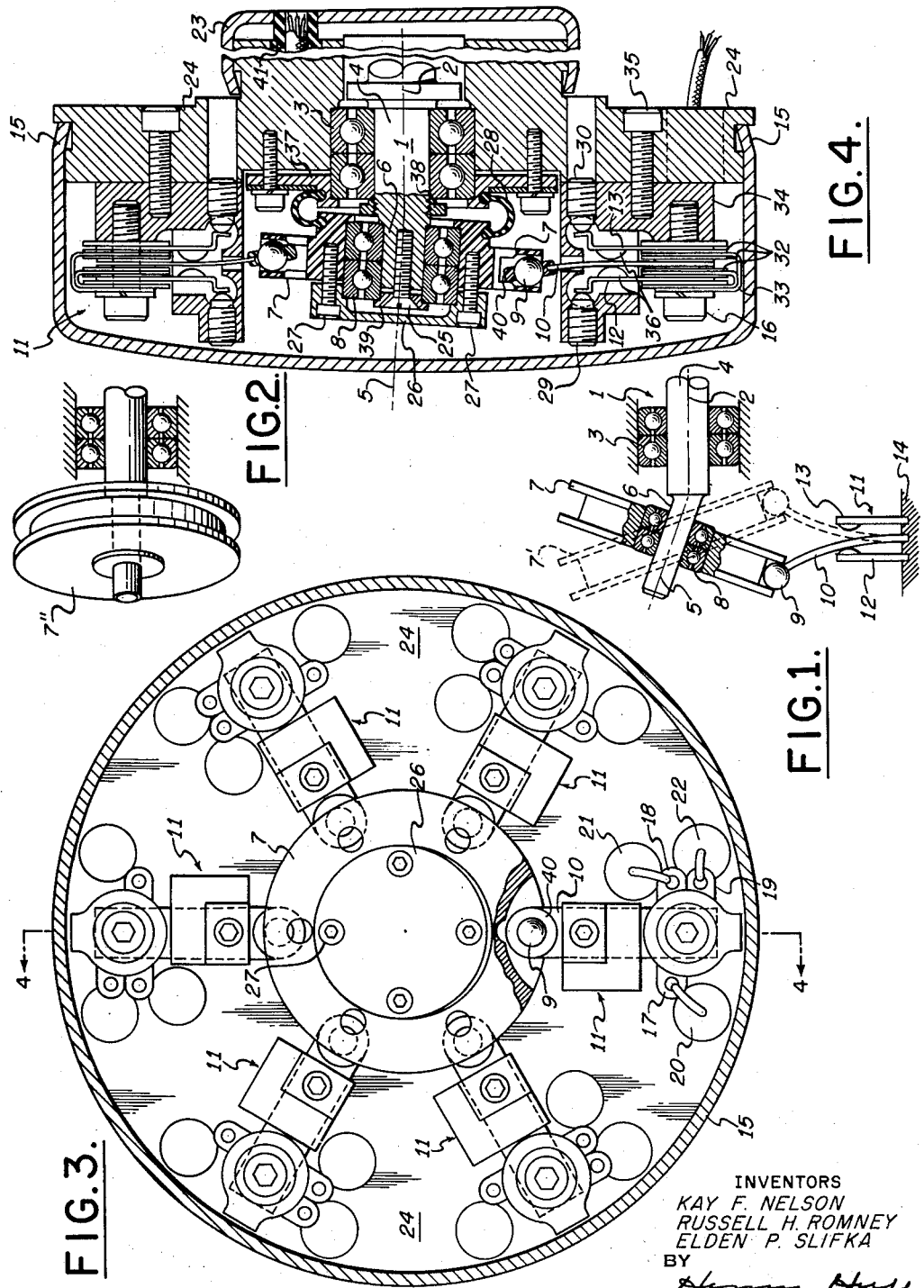

3,029,321
MECHANICALLY DRIVEN WOBBLE-PLATE CHOPPER

Kay F. Nelson, San Diego, Calif., and Russell H. Romney, Salt Lake City, and Elden P. Slifka, Bountiful, Utah, assignors to Sperry Rand Corporation, Great Neck, N.Y., a corporation of Delaware
Filed May 16, 1960, Ser. No. 29,444
6 Claims. (Cl. 200—23)

The present invention relates to devices for inverting very low level direct current signals into alternating current signals and, more particularly, to a mechanically driven single pole double throw switch useful in such devices.

The technique of inverting direct current signals into alternating current signals is commonly employed for the amplification of direct current signals. The alternating signal resulting from the inversion of the direct current signal is readily amplified to a desired level through the use of relatively stable alternating signal amplifiers. After amplification, the alternating signal is converted back to direct current. The successive operations of direct current to alternating current inversion, alternating current amplification, and alternating current to direct current conversion is preferred over the more straightforward technique of utilizing a direct-coupled amplifier especially where high gain is to be achieved. As is well understood in the art, the elimination of the direct current amplifier together with its objectionable tendency to drift more than justifies the relatively complex inversion-conversion technique.

Diverse types of single pole double throw switches are commercially available for use as direct current inverters. Familiar examples include electronic gating circuits and electromechanical choppers of the vibrating reed type. Although commercially available switches have been found generally satisfactory in ordinary signal inverting or converting applications, they have been found to be inadequate under conditions of extremely low signal level operation. In particular, such switches introduce objectionable noise components in the desired signals being operated upon because of unavoidable capacitive and inductive coupling acting between the switch actuating means and the circuit path through which the desired signal flows. Although the introduced noise components are of low signal levels, they obscure the desired signal being operated upon where said desired signal is of the order of microvolts.

It is the principal object of the present invention to provide a chopper suitable for the establishment and interruption of a very low level signal path.

Another object is to provide a low noise mechanical chopper for the inversion of direct current signals having amplitudes of the order of microvolts.

A further object is to provide a chopper characterized by durability, low noise factor and high operating speed.

These and other objects of the present invention, as will appear from a reading of the following specification, are accomplished in a preferred embodiment by the provision of a motor rotated shaft which is inclined at one end at a small angle relative to the axis of rotation. A circular plate of low friction coefficient material, such as nylon, is mounted about the inclined end of the shaft by means of duplex bearings. The plate is adapted at fixed intervals along its circumference to engage a central flexible member of a respective reed type switch. Each switch also includes two stationary contacting members spaced a fixed distance on either side of the flexible member.

As the motor driven shaft rotates, every point along the circumference of the circular plate reciprocates longitudinally along the axis about which the shaft is rotating. The reciprocating motion of the plate circumference is imparted to the central flexible member of each switch thereby causing said central member to contact the two stationary switch members in alternation. The rate with which contact is made between the switch members is determined by the speed of rotation of the motor driven shaft. Magnetic and electrostatic shielding members are positioned about the drive motor and the switch assembly so as to eliminate undesirable coupling between the two.

For a more complete understanding of the present invention, reference should be had to the following specification and to the figures of which:

FIG. 1 is a simplified representation of the moving elements of the wobble-plate chopper of the present invention;

FIG. 2 is another simplified representation similar to that of FIG. 1;

FIG. 3 is a partially cut away end view of a preferred embodiment of the invention; and FIG. 4 is a cross-sectional view of the embodiment of FIG. 3 taken along the axis 4—4.

In FIG. 1, shaft 1 is mounted for rotation about axis 2 by means of duplex bearings 3. A prime mover (not shown), such as an electric motor, is coupled to shaft 1 at end 4. The axis 5 of the portion 6 of shaft 1 is inclined at a small angle such as 3° relative to axis 2. The inclination angle has been exaggerated in the view of FIG. 1 for the sake of clarity. A circular plate 7 is mounted about portion 6 of shaft 1 by means of duplex bearings 8.

Ball-shaped member 9 is universally coupled to a fixed point along the circumference of plate 7. Member 9 is affixed to one end of flexible conducting reed 10 which is the movable contacting member of single pole double throw switch 11. Switch 11 also includes stationary conducting members 12 and 13. Members 10, 12 and 13 are rigidly fixed at one end to insulating base 14 as shown.

As shaft 1 is rotated about axis 2, portion 6 of shaft 1 nutates about the surface of a cone. The nutation of portion 6 imparts a wobbling motion to plate 7. Plate 7, however, does not rotate about axis 5; duplex bearings 8 permit plate 7 to remain fixed against such rotation. In the view of FIG. 1, inclined portion 6 of shaft 1 is in the plane of the drawings. Thus, only the edge of plate 7 is exposed to view. When shaft 1 is rotated through an angle of 180°, end 6 is again in the plane of the drawing but inclined downwardly rather than upwardly with respect to axis 2. In this position of shaft 1, plate 7 would be oriented as shown at 7'. As shaft 1 rotates, ball 9 is reciprocated between the positions of 7 and 7'. This reciprocating motion of ball 9 causes reed 10 to contact members 12 and 13 of switch 11 in alternation. Thus, the operation of a single pole double throw switch is achieved.

It will be recognized that the reciprocating motion shown in the view of FIG. 1 takes place at every point along the circumference of plate 7, as shaft 1 is rotated. This will be readily appreciated by reference to FIG. 2 which depicts the position of plate 7 after shaft 1 has been rotated counterclockwise by 90° from its position in FIG. 1. In the preferred embodiment, the reciprocating motion which is present throughout the circumference of plate 7 is exploited by mounting a plurality of radially positioned switching members about the periphery of plate 7. A representative arrangement of such radially mounted switching members is shown in FIG. 3.

Referring to FIG. 3, wobble plate 7 is adapted at equal increments along its circumference to engage a plurality of switching members 11. Each of the switches 11 is fastened to base plate 24. Each of the contacting members 10, 12 and 13 of each switch 11 is connected to a respective one of terminal lugs 17, 18 and 19. External circuit connections are made to each of lugs 17, 18 and 19 through apertures 20, 21 and 22 cut in base plate 24.

The arrangement of the component parts of the wobble-plate chopper is shown more clearly in the sectional view of FIG. 4 taken along the line 4—4 of FIG. 3. The simplified representations of FIGS. 1 and 2 correspond to the view of FIG. 4. The wobble-plate chopper is enclosed by metallic housing member 15 preferably consisting of a low reluctance material. Housing member 15 engages base plate 24. Portion 4 of shaft 1 is coupled to an electric drive motor (not shown) enclosed within housing member 23 to form an integral unit containing both the prime mover and the reciprocally actuated switches. The power leads for energizing the motor enter through aperture 41 in housing 23.

Shaft 1 is supported for rotation within base plate 24 by duplex bearings 3. The outer race of bearings 3 is clamped to plate 24 by retaining ring 37. The inner race of bearings 3 is fixed to shaft 1 by retaining ring 38. A circular plate 7 is mounted about portion 6 of shaft 1 by means of duplex bearings 8. The axis 5 of portion 6 is inclined at a small angle relative to the axis of rotation 2. The inner race of bearings 8 is fastened to portion 6 of shaft 1 by screw 25 and retaining ring 39; the outer race of bearings 8 is affixed to plate 7 by cap 26. Cap 26 is fastened by screws 27 to plate 7 and retains the lubricant for bearings 3 and 8. The bearing lubricant is further retained by neoprene gasket 28 which is attached between retaining ring 37 and plate 7.

Ball 9 engages plate 7 at a predetermined point along the circumference of the plate in a ball and socket relationship. Ball 9 is fixed to center flexible reed 10 of switch 11 by molded nylon washers 40 and causes reed 10 to reciprocate longitudinally along an arc substantially parallel to the axis of rotation of shaft 1. Reed 10, in turn, contacts contacting members 12 and 13 in alternation. Reeds 12 and 13 each have a pre-load bend away from center reed 10 to press against respective adjusting screws 29 and 30. Each adjusting screw has a glass tip 31 which contacts the corresponding one of outer reeds 12 and 13. It can be seen that the clearance between movable center reed 10 and fixed outer reeds 12 and 13 can be adjusted by advancing or retracting setting screws 29 and 30.

Reeds 10, 12 and 13 are electrically insulated from each other by insulating discs 32. Additional discs 33 of conductive material for electric shielding are provided to prevent capacitive coupling between reeds 10, 12 and 13. The reeds, insulating discs and electric shielding discs are mounted together on block 34 by screw 16. Block 34 consists of a low reluctance material for magnetically shielding contacting reeds 10, 12 and 13 of switch 11. Block 34 is affixed to base member 24 by screw 35.

Certain materials are preferred for the components of the wobble-plate chopper. Two considerations influence the selection of suitable material for plate 7 and ball 9. It is important, of course, that the center reed 10 of switch 11 be isolated from any electrical noise that might be generated within the drive motor or the duplex bearings 3 and 8. Secondly, it is desirable to minimize the frictional forces acting between plate 7 and ball 9 without necessitating the use of a lubricant. Both considerations can be met by employing nylon for plate 7 and synthetic sapphire for ball 9. Although the transmission of electrical noise from the drive motor and bearings to central reed 10 is minimized by the nylon-sapphire combination, static charges tend to accumulate at the junction between the ball and wobble plate. The static charge, in turn, could radiate to outer reeds 12 and 13 to thus introduce objectionable components in the desired signal being operated upon by the chopper. Outer contacts 12 and 13 are shielded from such undesirable radiation by contact block 34. Block 34 may be machined from a solid block of a low reluctance conductive material such as brass.

Shaft 1 preferably consists of beryllium copper which is noted for its low permeability and high strength. The low permeability characteristic aids in the minimization of magnetic flux linkages between the drive motor and the switch contacting members.

The contacting reeds 10, 12 and 13 are each preferably comprised of a high strength gold alloy. The outer reeds 12 and 13 have a spherical dimple 36 to provide good electrical connection at each reciprocation of flexible center reed 10 while preventing deformation due to impact. A representative wobble-plate chopper constructed in accordance with the above-described preferred embodiment was found to introduce less than one microvolt noise signal into a 500,000 ohm signal circuit being interrupted.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A mechanically driven switch comprising a shaft mounted for rotation about an axis of revolution, said shaft being inclined at one end at a small angle relative to said axis, a first member mounted about said end of said shaft, means for rotating said shaft about said axis thereby imparting a reciprocating motion to said first member longitudinally along said axis, a flexible member of conductive material, said first member slidably gripping one end of said flexible member, the other end of said flexible member being held in fixed position whereby said one end of said flexible member is continuously constrained to follow the longitudinal reciprocation of said first member, and a pair of stationary contacting members positioned on respective sides of said flexible member, the reciprocation of said flexible member causing said flexible member to contact said stationary members in alternation.

2. A mechanically driven switch comprising a shaft mounted for rotation about an axis of revolution, said shaft being inclined at one end at a small angle relative to said axis, a circular plate rotatably mounted about said end of said shaft, means for rotating said shaft about said axis thereby wobbling said plate and imparting a reciprocating motion thereto longitudinally along said axis, a flexible member of conductive material, said plate being adapted to slidably grip engaging one end of said flexible member, the other end of said flexible member being held in fixed position whereby said one end of said flexible member is continuously constrained to follow the longitudinal reciprocation of said plate, and first and second stationary contacting members positioned on respective sides of said flexible member, the reciprocation of said flexible member causing said flexible member to contact said first and second stationary members in alternation.

3. A mechanically driven switch comprising a shaft mounted for rotation about an axis of revolution, said shaft being inclined at one end at a small angle relative to said axis, a circular plate rotatably mounted about said end of said shaft, means for rotating said shaft about said axis thereby wobbling said plate and imparting a reciprocating motion thereto longitudinally along said axis, a plurality of reed type switches each having a flexible central member, said plate being adapted to slidably grip at each of a plurality of fixed intervals along its circumference a flexible central member of a respective reed type switch whereby each said flexible member is continuously constrained to follow the longitudinal reciprocation of said plate, each switch being held in fixed position radially about said circumference whereby said flexible member is reciprocated relative to said switch by said plate, each said switch including two stationary contacting members spaced a fixed distance on either side of said flexible member, the reciprocation of said flexible member causing said flexible member to contact said stationary members in alternation.

4. Apparatus as defined in claim 3 wherein said circular plate consists of nylon and further including a sapphire sphere affixed to one end of each said central flexible member, said plate slidably gripping each said flexible member via a respective sphere.

5. Apparatus as defined in claim 4 and further including electrostatic shielding means for isolating each said sphere from said stationary members.

6. Apparatus as defined in claim 4 wherein said means for rotating comprises an electric motor coupled to said shaft and said shaft comprises beryllium copper.

References Cited in the file of this patent

UNITED STATES PATENTS

| 2,574,698 | Hall | Nov. 13, 1951 |
| 2,715,163 | Haviland | Aug. 9, 1955 |
| 2,776,384 | Long | Jan. 1, 1957 |

FOREIGN PATENTS

| 623,302 | France | Mar. 15, 1927 |
| 691,897 | Germany | June 7, 1940 |